(12) United States Patent
Zhong et al.

(10) Patent No.: US 11,380,116 B2
(45) Date of Patent: Jul. 5, 2022

(54) AUTOMATIC DELINEATION AND EXTRACTION OF TABULAR DATA USING MACHINE LEARNING

(71) Applicant: INTERNATIONAL BUSINESS MACHINES CORPORATION, Armonk, NY (US)

(72) Inventors: Peter Zhong, Vermont (AU); Antonio Jose Jimeno Yepes, Melbourne (AU); Elaheh Shafieibavani, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 407 days.

(21) Appl. No.: 16/659,977

(22) Filed: Oct. 22, 2019

(65) Prior Publication Data

US 2021/0117668 A1   Apr. 22, 2021

(51) Int. Cl.
*G06V 30/414* (2022.01)
*G06N 3/04* (2006.01)
*G06N 20/00* (2019.01)

(52) U.S. Cl.
CPC ......... *G06V 30/414* (2022.01); *G06N 3/0454* (2013.01); *G06N 3/0481* (2013.01); *G06N 20/00* (2019.01)

(58) Field of Classification Search
CPC ............. G06K 9/00463; G06K 9/4628; G06N 3/0454; G06N 3/0481; G06N 20/00; G06N 3/0445; G06N 3/084
See application file for complete search history.

(56) References Cited

U.S. PATENT DOCUMENTS 7,142,728 B2 * 11/2006 Wnek .................. G06V 30/416
                                                    382/173
7,590,647 B2 *  9/2009 Srinivasan ............ G06F 40/205
                                                    715/708
(Continued)

FOREIGN PATENT DOCUMENTS

CA        3027038 A1    12/2017
CN      105868758 A     8/2016
(Continued)

OTHER PUBLICATIONS

International Search Report and Written Opinion; dated Feb. 3, 2021; Application No. PCT/US2020/059845 Filed: Oct. 20, 2020; 10 pages.
(Continued)

*Primary Examiner* — Lewis G West
(74) *Attorney, Agent, or Firm* — Cantor Colburn LLP; Joseph Petrokaitis

(57) ABSTRACT

A computer-implemented method for using a machine learning model to automatically extract tabular data from an image includes receiving a set of images of tabular data and a set of markup data corresponding respectively to the images of tabular data. The method further includes training a first neural network to delineate the tabular data into cells using the markup data, and training a second neural network to determine content of the cells in the tabular data using the markup data. The method further includes, upon receiving an input image containing a first tabular data without any markup data, generating an electronic output corresponding to the first tabular data by determining the structure of the first tabular data using the first neural network and extracting content of the first tabular data using the second neural network.

17 Claims, 8 Drawing Sheets

(56) References Cited

U.S. PATENT DOCUMENTS

| | | | |
|---|---|---|---|
| 8,229,864 B1* | 7/2012 | Lin | G06F 40/18 |
| | | | 706/11 |
| 8,443,278 B2 | 5/2013 | Mansfield et al. | |
| 8,914,419 B2 | 12/2014 | Gerard et al. | |
| 9,063,719 B1 | 6/2015 | Lam | |
| 9,135,327 B1* | 9/2015 | George | G06F 16/245 |
| 9,965,809 B2 | 5/2018 | Dejean | |
| 10,241,992 B1 | 3/2019 | Middendorf | |
| 10,242,257 B2 | 3/2019 | Hossabettu | |
| 10,289,636 B2 | 5/2019 | Pfeifle et al. | |
| 10,303,771 B1 | 5/2019 | Jezewski | |
| 10,339,212 B2 | 7/2019 | Agrawal et al. | |
| 10,387,531 B1* | 8/2019 | Vanhoucke | G06F 40/284 |
| 10,445,345 B2 | 10/2019 | Pan et al. | |
| 10,706,228 B2* | 7/2020 | Buisson | G06F 40/174 |
| 2005/0210372 A1* | 9/2005 | Kraft | G06F 40/106 |
| | | | 715/255 |
| 2006/0288268 A1* | 12/2006 | Srinivasan | G06F 16/86 |
| | | | 715/210 |
| 2013/0297661 A1* | 11/2013 | Jagota | G06F 16/11 |
| | | | 707/822 |
| 2013/0318426 A1* | 11/2013 | Shu | G06V 30/416 |
| | | | 715/226 |
| 2016/0342498 A1 | 11/2016 | Brink | |
| 2017/0052988 A1 | 2/2017 | Guggilla et al. | |
| 2017/0329749 A1* | 11/2017 | Milward | G06F 40/166 |
| 2017/0351913 A1* | 12/2017 | Chen | G06V 30/40 |
| 2018/0113921 A1 | 4/2018 | Baranczyk et al. | |
| 2018/0336405 A1 | 11/2018 | Messina | |
| 2019/0122042 A1 | 4/2019 | Sunagawa | |
| 2019/0205690 A1* | 7/2019 | Shanmugavel | G06V 10/273 |
| 2019/0213685 A1* | 7/2019 | Ironside | G06N 20/00 |
| 2019/0266394 A1* | 8/2019 | Yu | G06V 30/414 |
| 2019/0278862 A1 | 9/2019 | Kapoor et al. | |
| 2019/0286692 A1* | 9/2019 | Odate | G06K 9/622 |
| 2019/0318212 A1* | 10/2019 | Govrin | G06T 3/40 |
| 2019/0325212 A1* | 10/2019 | Liu | G06F 16/353 |
| 2019/0361972 A1* | 11/2019 | Lin | G06V 10/82 |
| 2020/0019768 A1 | 1/2020 | Chen et al. | |
| 2020/0042785 A1* | 2/2020 | Burdick | G06V 30/416 |
| 2020/0089946 A1* | 3/2020 | Mallick | G06V 30/412 |
| 2020/0151444 A1* | 5/2020 | Price | G06N 3/08 |
| 2020/0175267 A1* | 6/2020 | Schäfer | G06V 30/412 |
| 2020/0175690 A1* | 6/2020 | Weller | G06V 30/158 |
| 2020/0227168 A1* | 7/2020 | Kimmerling | G06N 3/0454 |
| 2020/0311413 A1* | 10/2020 | Zhang | G06V 30/2272 |

FOREIGN PATENT DOCUMENTS

| | | |
|---|---|---|
| CN | 106503055 A | 3/2017 |
| CN | 108416279 A | 8/2018 |
| CN | 108549850 A | 9/2018 |

OTHER PUBLICATIONS

Li et al., "TableBank: Table Benchmark for Image-based Table Detection and Recognition," Proceedings of the 12th Language Resources and Evaluation Conference, May 11-16, 2020, pp. 1918-1925.

Perez-Arriaga et al., "TAO: System for Table Detection and Extraction from PDF Documents," Proceedings of the Twenty-Ninth International Florida Artificial Intelligence Research Society Conference, 2016, pp. 591-596.

Schreiber et al., "DeepDeSRT: Deep Learning for Detection and Structure Recognition of Tables in Document Images," 14th IAPR International Conference on Document Analysis and Recognition, 2017, 6 pages.

Vine et al., "Extracting Tables from Documents using Conditional Generative Adversarial Networks and Genetic Algorithms," 2019 International Joint Conference on Neural Networks, 2019, 8 pages.

* cited by examiner

AUTOMATIC DELINEATION AND EXTRACTION OF TABULAR DATA USING MACHINE LEARNING

BACKGROUND

The present invention relates generally to computer technology, and more particularly to a content recognition system that automatically determines a structure that is used to present information as tabular data and further determines the content in the tabular data.

A substantial amount of literature, including books, papers, articles, blogs, reports, etc., is generated in any field, such as medicine, law, engineering, science, business, etc. In addition, literature is generated as part of commerce, e.g. invoices, quotes, account statements, contracts, etc. All such literature is typically written for exchange between persons without any plan for machine understanding. The documents, for purposes of differentiation, are described as "natural language" documents as distinguished from documents or files written for machine readability and understanding. With the advent of artificial intelligence and other advances in machine learning, machines, such as computers, can analyze the corpus of information from the literature to provide insights that may not be detectable by humans. Various document parsing and analysis systems exist that facilitate deciphering contents of the literature and provide functionality such as search capability.

SUMMARY

According to one or more embodiments of the present invention, a computer-implemented method for using a machine learning model to automatically extract tabular data from an image includes receiving a set of images of tabular data and a set of markup data corresponding respectively to the images of tabular data. The method further includes training a first neural network to delineate the tabular data into cells using the markup data, and training a second neural network to determine content of the cells in the tabular data using the markup data. The method further includes, upon receiving an input image containing a first tabular data without any markup data, generating an electronic output corresponding to the first tabular data by determining the structure of the first tabular data using the first neural network and extracting content of the first tabular data using the second neural network.

According to one or more embodiments of the present invention, a system includes a memory, and a processor coupled with the memory. The processor is programmed with machine learning algorithms to perform a method that includes training a machine learning model. The training includes receiving a set of images of tabular data and a set of markup data corresponding respectively to the images of tabular data. The training further includes training a first neural network to delineate the tabular data from the set of images into cells using the markup data. The training further includes training a second neural network to determine content of the cells in the tabular data from the set of images using the markup data. The method, after the training, further includes, upon receiving an input image containing a first tabular data without markup data indicative of a structure of the first tabular data, generating an electronic output corresponding to the first tabular data by determining the structure of the first tabular data using the first neural network and extracting content of the first tabular data using the second neural network.

According to one or more embodiments of the present invention, a computer program product includes a memory storage device having computer executable instructions stored thereon. The computer executable instructions when executed by a processor cause the processor to perform a method that includes training a machine learning model. The training includes receiving a set of images of tabular data and a set of markup data corresponding respectively to the images of tabular data. The training further includes training a first neural network to delineate the tabular data from the set of images into cells using the markup data. The training further includes training a second neural network to determine content of the cells in the tabular data from the set of images using the markup data. The method, after the training, further includes, upon receiving an input image containing a first tabular data without markup data indicative of a structure of the first tabular data, generating an electronic output corresponding to the first tabular data by determining the structure of the first tabular data using the first neural network and extracting content of the first tabular data using the second neural network.

Embodiments of the present invention facilitate the use of machine learning to automatically parse and understand tabular data in digital literature and in turn to use the literature for complete analysis. According to one or more embodiments of the present invention tabular data in the literature is deciphered despite the tabular data being presented in various layouts, styles, information type and format, and without explicit description of the encoding/formatting information about the structure of the tabular data. Accordingly, embodiments of the present invention facilitate improvements to automatic content recognition systems that are currently unable to automatically decipher tabular data presented.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
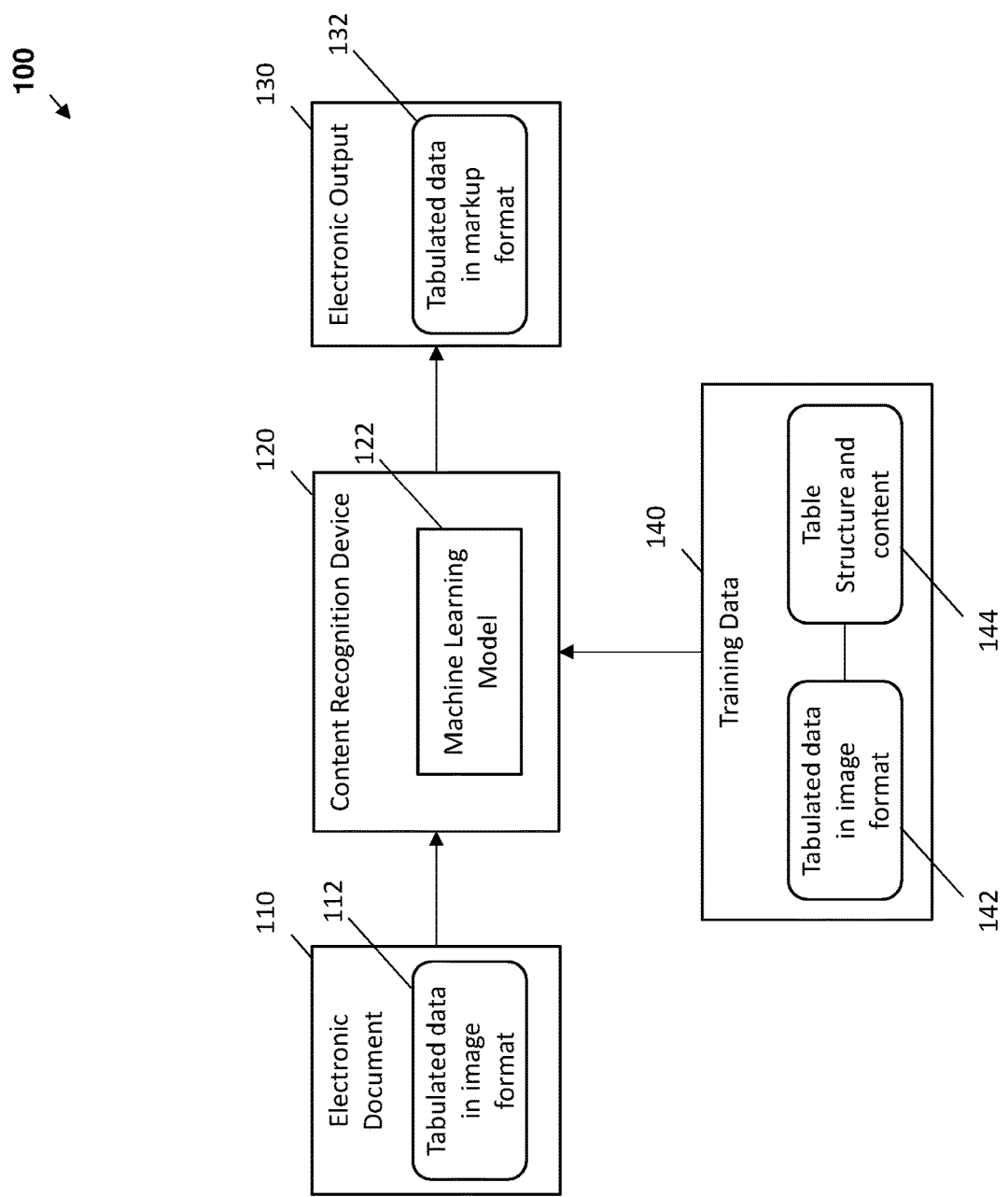
FIG. 1 depicts a system for content recognition according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Published literature includes vital information presented in tabular format ("tables"), that is, as tabulated data included in the document(s). The literature can include information presented in the form of a table that organizes the information across multiple rows and columns. Such tabular data facilitates presenting information in a structured manner, summarizing key information, and presenting results and/or observations. Typically, the tabulated data is included in the document as an image, without any corresponding information that describes the structure that is used to tabulate the data. The structure indicates how the data is delineated, for example, into rows, columns, cells, and other such components of the table.

In many cases, understanding the information in tables is central to analyzing the various documents in the literature. Accordingly, it is necessary in machine learning to read and understand tabular data to use the literature for complete analysis. However, a technical challenge exists in deciphering tabular data in literature because of the tabular data being presented in various layouts, styles, information type and format, and without explicit description of the encoding/formatting information about the structure of the tabular data. While humans are adept at reading such varied tabular data layouts and styles, deciphering the tabular data is a technical challenge. Some examples of variability in tables may include, different heights of rows and columns, merging of first neural network memory cells, different number of columns, different number of rows in different columns, or different types of borders distinguishing the cells, etc.

For example, in the case of medical literature such as clinical studies, information regarding results across different groups is contained in such tables. It is understood that medical literature is just one example, and that tabulated data is presented in literature in various other fields, such as engineering, science, business, law, etc., and the embodiments of the present invention are not limited to using documents from any particular field.

Further, in multiple cases, the data that is presented in a document using the tabulated format is not present in the remaining text of the document. Hence, for an automatic content recognition system that parses available literature autonomously to decipher the contents of the document, a technical challenge exists to decipher such tabulated data. Currently, it is a technical challenge to parse such tabulated data because there is no standard format or structure that is used for tabulating the data. The data is typically tabulated for human understanding, and humans are generally adept at parsing such data that is formatted in tabular format using ad hoc structures, and without having to be provided a description of the formatting.

Embodiments of the present invention address such technical challenges and facilitate machines to autonomously understand the structure (or format) of tabulated data in order to extract meaning of the tabulated data. One or more embodiments of the present invention facilitate training a machine learning (ML) model to receive tabulated data without any description of the structure or delineation or labels specifying the formatting of the tabulated data, to identify discrete columns, rows, and/or cells, and to extract the content (e.g. text, images etc.) that is included in the table. In one or more embodiments of the present invention the extracted content is output in a structured and meaningful format.

In one or more embodiments of the invention, the ML model receives the tabulated data in the form of digital images of tables that do not have any delineation or labels specified. For example, the digital images can be in any digital image file format such as bitmap, Joint Photographic Experts Group (JPEG), portable network graphic (PNG), or any other format. In one or more examples, the images of tabulated data are extracted from documents, which in turn are in any digital content format, such as portable document format (PDF), DOC, and the like. The ML model can then identify discrete columns, rows, and cells, and extract the text included therein in a structured and meaningful way. In one or more embodiments of the present invention, the extracted data is output using computer readable format such as hypertext markup language (HTML), extended markup language (XML), or any other such computer readable format.

FIG. 1 depicts a system 100 for content recognition according to one or more embodiments of the present invention. The system 100 can be the content recognition workload 96 depicted in FIG. 8. Alternatively, as noted herein, the system 100 can be a stand along system used for content recognition. The system 100 includes, among other components a content recognition device 120 that receives an input image 112 of tabulated data from an electronic document 110. The input image 112 that is received is not accompanied with any structural information that describes the format of the tabulated data in the input image 112.

The content recognition device 120 uses an ML model 122 to parse the content of the input image 112 and generate an electronic output 130 that includes the tabulated data in markup format 132. The tabulated data in the markup format 132 includes a structure of the tabular data in delineated format, for example, describing the cells in the tabular data. For example, the delineated format describes the rows and the columns of the tabular data that divides the data into multiple cells. In one or more embodiments of the present invention, the content recognition device 120 can also extract text from the input image 112 and include it in the electronic output 130. The extracted text can be presented such that the meaning can be determined based on the relationships between the cells in the tabular data.

The ML model 122 is trained to parse the content of the input image 112 using training data 140. The training data 140 includes extracted images 142 of tabular data paired with the corresponding markup data 144 that provides structure and content of the tabular data in the extracted images 142. The training data 140 includes multiple (e.g.

thousands, millions etc.) such corresponding pairs of extracted images 142 of tabular data and corresponding markup data 144 of tabular structure and content. The training data 140 is used by the ML model to lean to identify table structure and content in a given image of tabular data, such as the input image 112, without the corresponding description of the structure of the tabular data.

Figure 2:
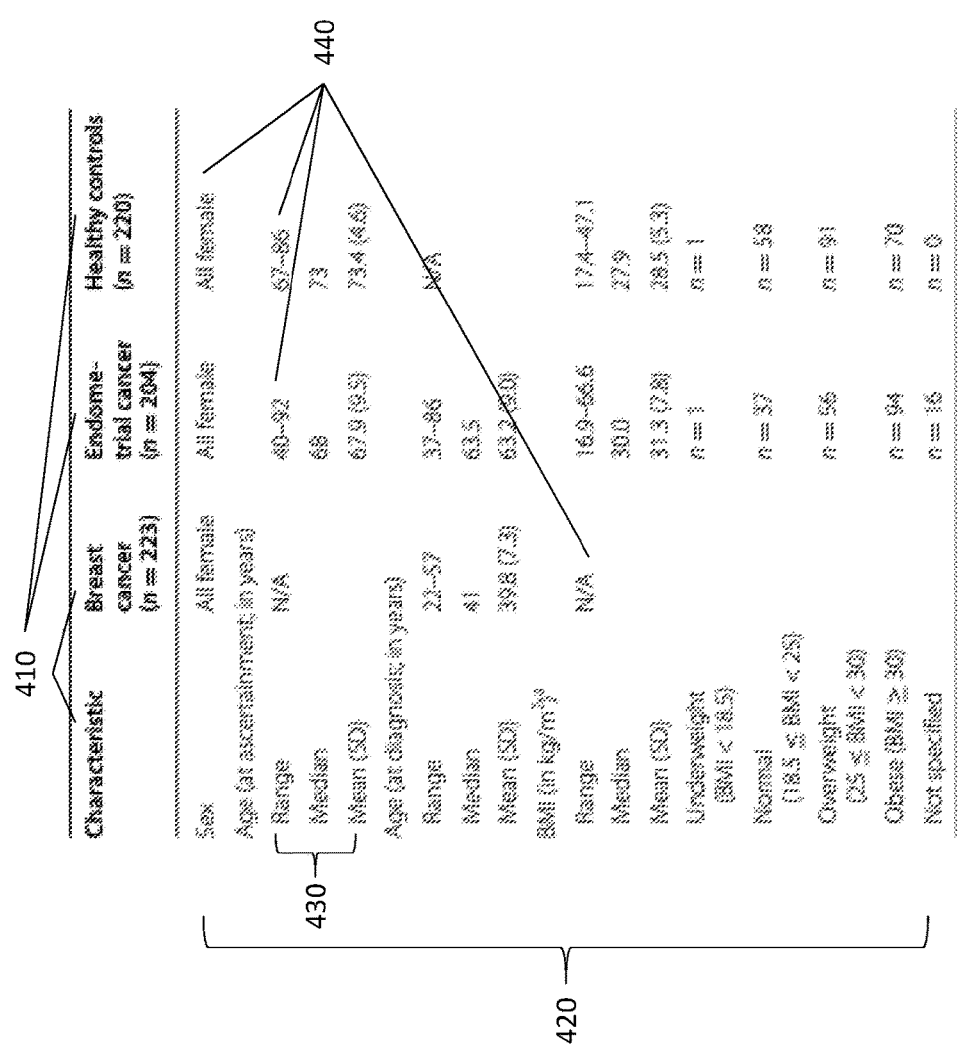
FIG. 2 depicts an example input image in image format in an example scenario.
Figure 3:
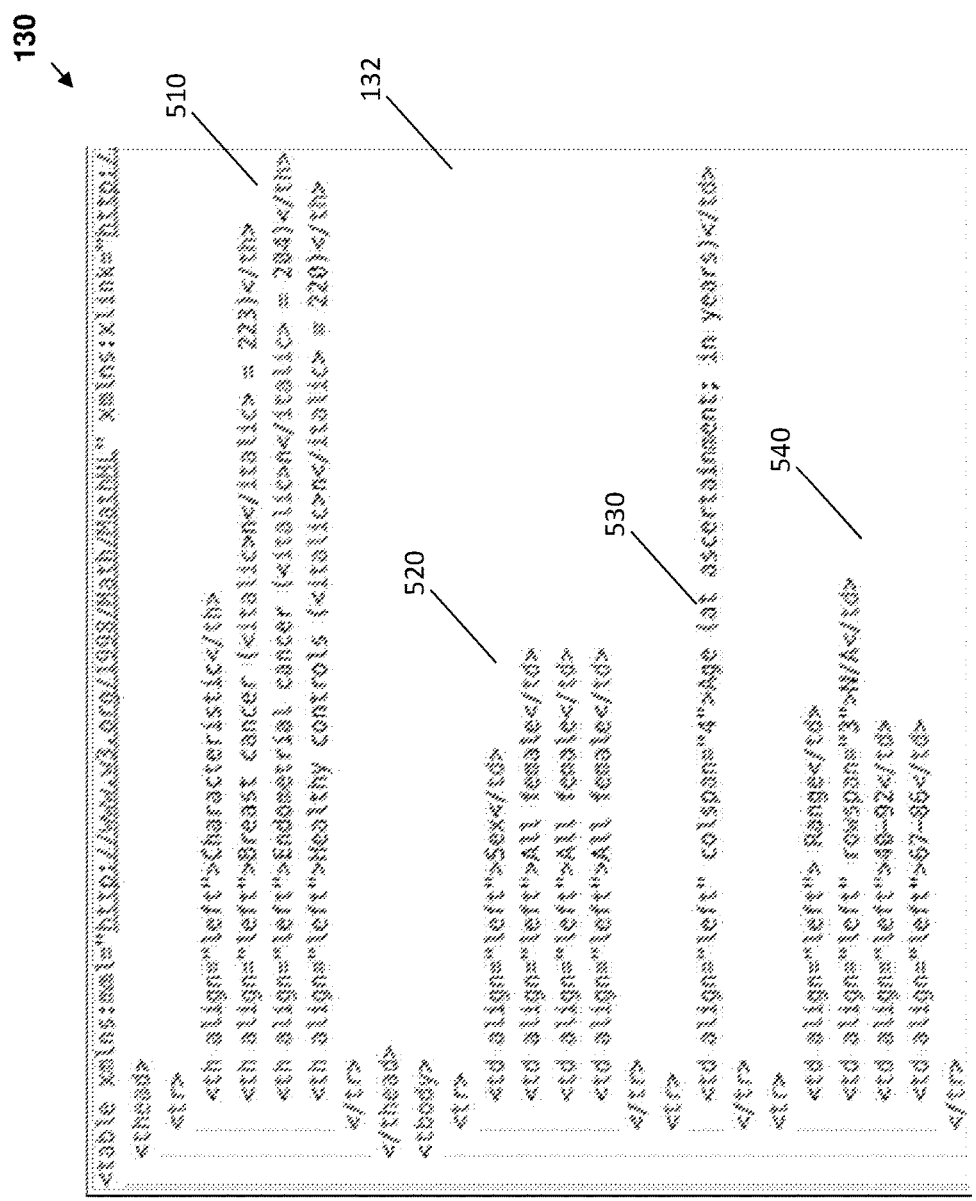
FIG. 3 depicts an electronic output of tabular data from the input image in markup format in an example scenario.

FIG. 2 depicts an example input image 112 in an example scenario, and FIG. 3 depicts an electronic output 130 in an example scenario. In the depicted example shown in FIG. 2, the input image 112 includes columns 410 and rows 420. As shown, one or more rows can include sub-rows 430. The rows 420 and the columns 410 form multiple cells 440. The structure of the tabular data is delineated into markup format 132 in the electronic output 130 as shown in FIG. 3. The delineation in the markup format 132 describes the column delineation 510 corresponding to the columns 410. The column delineation 510 indicates a number of columns 410. The column delineation 510 also describes the headings of the columns 410. The column delineation 510 can include other characteristics to describe the columns 410 in other examples where the columns 410 have other attributes, such as sub-columns, for example.

The markup format 132 shown in FIG. 3 also includes row delineation 520 corresponding to the rows 420. The row delineation 520 describes a number of rows 420 in the input image 112. The row delineation 520 also includes the headings of the rows 420. The row delineation 520 also includes the sub-delineation 530 for a row 420 that includes one or more sub-rows 430.

Further, the electronic output 130 shown in FIG. 3 includes the extracted text 540 from the cells 440 shown in FIG. 2. The extracted text 540 is included according to the structure that is delineated from the input image 112 shown in FIG. 2.

Figure 4:
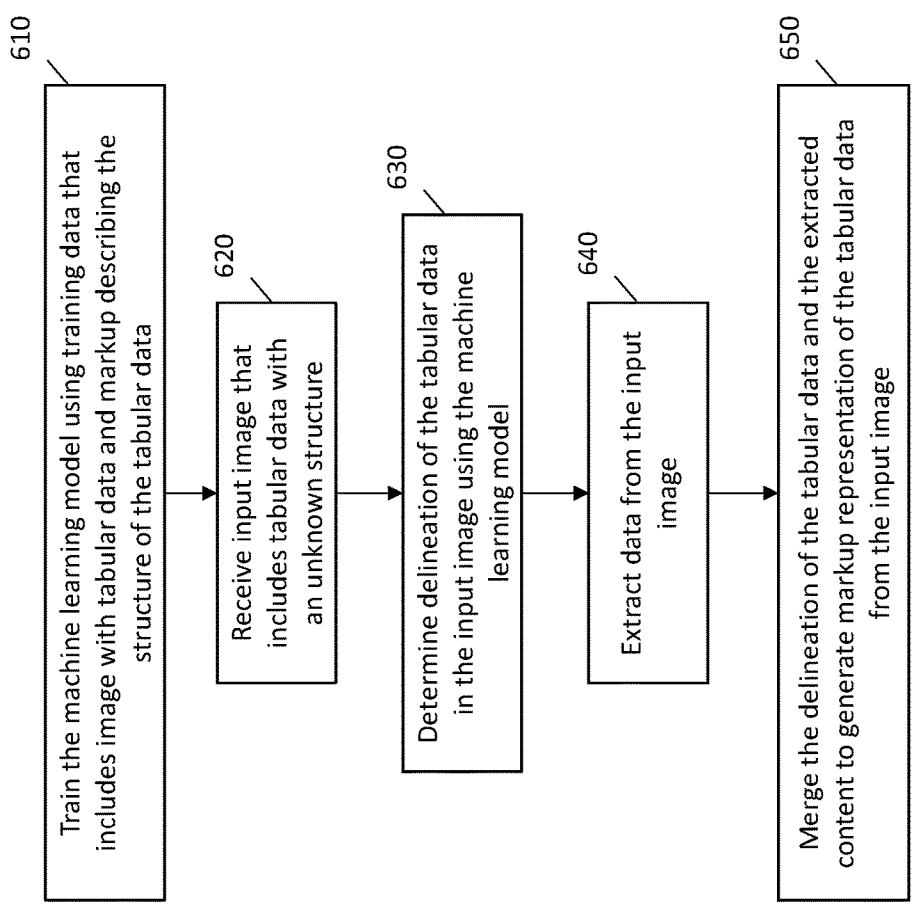
FIG. 4 depicts a flowchart of a method for training a machine learning model to extract tabular data from an input image according to one or more embodiments of the present invention.

FIG. 4 depicts a flowchart of a method 600 for training the ML model 122 of the content recognition device 120 to extract tabular data from the input image 112 according to one or more embodiments of the present invention. The method 600 includes training the ML model 122 using the training data 140, at block 610. The training data includes training images 142 with tabular data and corresponding training markup data 144 that describes the structure and content of the tabular data in the training images 142. In one or more examples, the training markup data 144 can be multiple XML files that provide labels of the tabular data in corresponding image files or document files that include the training images 142.

The training markup data 144 provides the ML model 122 with normalized structured representation of the tabular data in the training images 142. In one or more embodiments of the present invention, the training images 142 are generated by concerting tabular data in multiple documents (e.g. PDF files) into image files (e.g., JPEG). Such conversion can be performed automatically in one or more examples, so that the training data 140 itself is generated without manual efforts. The training data 140 provides multiple (thousands, millions) of samples that provide the training images 142 accompanied by ground truth of the tabular data in markup representation 144.

Figure 5:
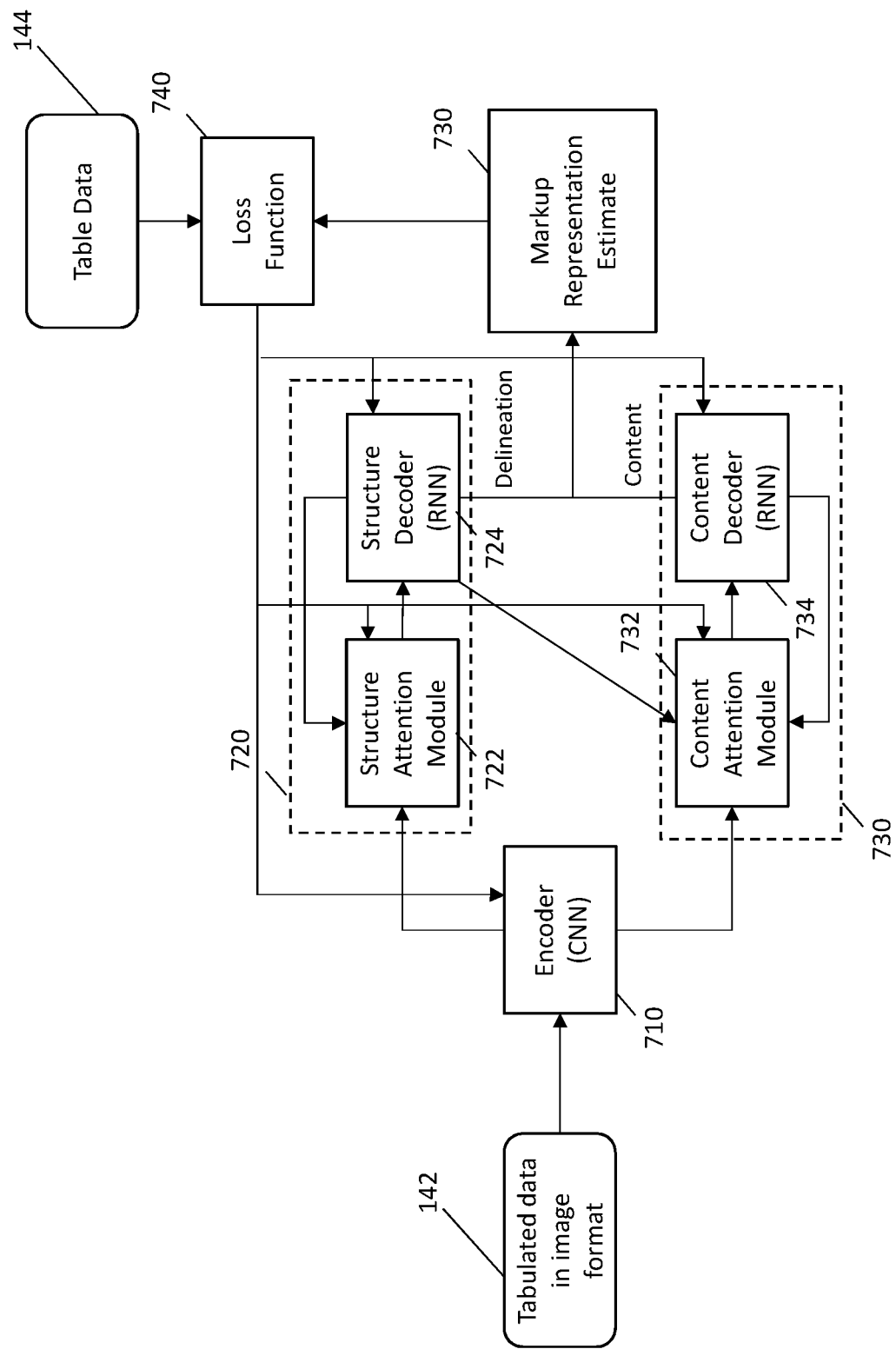
FIG. 5 depicts an example structure of a machine learning model and a dataflow of training the machine learning model according to one or more embodiments of the present invention.

The ML model 122, in one or more embodiments of the present invention, can have a deep learning network architecture, which can be trained with the training data 140. FIG. 5 depicts an example structure of the ML model 122 and a dataflow of training the ML model 122 according to one or more embodiments of the present invention.

In one or more embodiments of the present invention the ML model 122 is a deep neural network learning architecture that uses an encoder-decoder model with multiple layers of convolutional neural network (CNN), attention modules, and recurrent neural networks (RNN). The ML model 122 in one or more embodiments of the present invention includes an encoder 710, and two decoding sets, a first decoding set 720 and a second decoding set 730.

The encoder 710 includes one or more CNNs that analyze the training images 142 and use a set of convolutional filters to capture the visual features of the training images 142. The parameters of the convolutional filters are updated during training via back propagation. The visual features collectively are called a feature map. Each pixel in the feature map is a high-dimensional feature vector which describes the pattern of a corresponding local patch (e.g., 16×16 pixels) in the training images 142. The encoder 710 forwards the feature map to the first decoding set 720 and the second decoding set 730.

The decoding sets 720, 730 can include one or more units of RNNs and attention modules. In one or more examples, the RNNs can be implemented as long short-term memory (LSTM) or gated recurrent unit (GRU) cells. The first decoding set 720 can be used to determine the structure of the tabular data in the training images 142 (and input image 112). Accordingly, the first decoding set 720 can also be referred to as a set of structure decoding neural networks. The second decoding set 730 can be used to determine the contents of one or more cells in the tabular data of the training images 142 (and input image 112). Accordingly, the second decoding set 730 can also be referred to as a set of content decoding neural networks.

The set of structure decoding neural networks (720) includes a structure attention module 722 and a structure decoder 724, which is an RNN. The structure attention module 722 is a neural network that learns how to assign different degrees of focus on different portions of the feature map encoded from training images 142 (and input image 112) to decipher the structure. Higher-degree focus in a certain region of the feature map makes the structure decoder 724 exploit more information from that region. The degree of focus at a given location in the feature map is determined by multiplying a set of weight parameters to the feature map itself, as well as a "hidden state" of the structure decoder 724. In an RNN, a "hidden state," in the context of a recurrent layer, is a value that is shared during the recurrence to provide a representation of previous inputs. The weight parameters of the attention module 722 are adjusted during the training via back propagation as will be described further. The attention module 722 analyzes the feature map of the training images 142 to determine the degree of focus. The structure decoder RNN 724 also includes its own weight parameters that are updated via back propagation. The structure decoder RNN 724 and the structure attention module 722 are repeatedly trained in conjunction with each other to adjust the weight parameters of both networks, the structure decoder RNN 724 and the structure attention module 722.

The weights are updated to minimize the difference between the markup representation estimate 730 that is generated by the set of structure decoding neural networks (720) and the known tabular structure 144 for the training images 142. As depicted in FIG. 5, the markup representation estimate is compared with the tabular structure 144 to compute a loss function 740. The loss function 740 indicates a difference in the structure that is extracted and the known structure in the training data 144. The loss function 740 is provided as feedback to the structure decoder RNN 724, the structure attention module 722, and encoder 710. Alternatively, a structure accuracy score is computed based on the difference and provided as a feedback. The weights of the structure decoder RNN 724, the structure attention module 722, and encoder 710 are updated based on the structure accuracy score to make the markup representation estimate 730 closer to the tabular data 144. In one or more examples, the structure accuracy score is compared with a predetermined accuracy threshold. If the structure accuracy score exceeds the predetermined structure accuracy threshold, the set of structure decoding neural networks 720 are marked as being trained. Alternatively, if the structure accuracy score is different from the predetermined structure accuracy threshold by more than a certain threshold, the set of structure decoding neural networks 720 are continued to be trained, i.e., weights adjusted.

The set of content decoding neural networks 730 is trained and operates in similar manner to the set of structure decoding neural networks 720. The set of content decoding neural networks 730 includes a content attention module 732 and a content decoder 734, which is an RNN. The content attention module 732 is a neural network that learns how to assign different degrees of focus on different portions of the feature map encoded from training images 142 (and input image 112) to decipher the content. Higher-degree focus in a certain region of the feature map makes the content decoder 734 exploit more information from that region. The degree of focus at a given location in the feature map is determined by multiplying a set of weight parameters to the feature map itself, as well as the hidden state of the structure decoder 724 and the hidden state of the content decoder 734. The weight parameters of the content attention module 732 are adjusted during the training via back propagation as will be described further. For example, the content attention module 732 analyzes the feature map of the training images 142 that are to be used by the content decoder RNN 734. The content decoder RNN 734 also includes its own weight parameters that are updated via back propagation. The content decoder RNN 734 and the content attention module 732 are repeatedly trained in conjunction with each other to adjust the weight parameters of both networks, the content decoder RNN 734 and the content attention module 732.

The weights are updated to minimize the difference between the representation estimate 730 that is generated be the set of content decoding neural networks and the known content in tabular data for the training images 142. As depicted in FIG. 5, the markup representation estimate 730 is compared with the tabular data 144 to compute the loss function 740. The loss function 740 indicates a difference in the content that is extracted and the known content in the training data 144. The loss function 740 is provided as feedback to the content decoder RNN 734, the content attention module 732, and encoder 710. Alternatively, a content accuracy score is computed based on the difference and provided as a feedback. The weights of the content decoder RNN 734, the content attention module 732, and encoder 710 are updated based on the content accuracy score to make the markup representation estimate 730 closer to the tabular data 144. In one or more examples, the content accuracy score is compared with a predetermined accuracy threshold. If the accuracy score exceeds the predetermined accuracy threshold, the set of content decoding neural networks 730 are marked as being trained. Alternatively, if the accuracy score is different from the predetermined accuracy threshold by more than a certain threshold, the set of content decoding neural networks 730 are continued to be trained, i.e., weights adjusted.

Accordingly, for delineating tabular data presented in an image format, in one or more embodiments of the present invention, the ML model 120 includes three neural networks—the encoder 710, the structure attention module 722, and the structure decoder 724. The encoder 710 determines feature maps from the training images, which are forwarded to the structure attention module 722. The structure attention module 722 determines degree of focus from the feature maps. The structure decoder uses the degree of focus and the feature maps to determine delineation estimate of the structure of the tabular data. Based on a difference between the estimate and the markup representation from the training data 144, the weights of the encoder 710, the structure attention module 722, and the structure decoder 724 are updated/adjusted.

In addition, the ML model 120 includes, for extracting content from the tabular data, the content attention module 732 and the content decoder 734, both of which work in conjunction with the encoder 710. Here, the content attention module 732 uses the feature maps that are determined by the encoder 710 to determine degrees of focus for content extraction. The content decoder 734 subsequently determines content estimate using the feature maps and the degrees of focus. The difference between the content estimate and the actual content from the training data is used to adjust the weights of the encoder 710, the content attention module 730, and the content decoder 734. In one or more examples, the content attention module 732 uses inputs from the structure decoder 724. In one or more examples, all the neural networks in the ML model 120 are trained in conjunction.

Referring back to the flowchart of the method 600 in FIG. 4, in one or more embodiments of the present invention, the method 600 further includes receiving the input image 112 that includes tabular data with an unknown structure, at block 620. In other words, the structure of the tabular data in the input image is unknown to the content recognition device 120.

The content recognition device 120 determines the delineation of the structure of the tabular data in the input image 112 using the trained ML model 122, at block 630. Particularly, the structure decoding neural network(s) facilitate identifying the delineation of the tabular data based on the weights that are setup during the training. The delineation includes a markup representation of the cells 440 in the input image 112. The delineation also includes a markup representation of the columns 410 and the rows 420 from the tabular data. The delineation further identifies the demarcation between sub-rows and sub-columns that may be present in the tabular data.

Further, the method 600 includes extracting content from the tabular data in input image 112, at block 640 using the set of content decoding neural networks 730.

The method 600 further includes merging the extracted content and the delineation of the tabular data from the input image 112, at block 650. The merging includes adding the extracted content in the markup representation of the delineated structure of the tabular data. Accordingly, in one or more embodiments of the present invention, a markup file is generated (see FIG. 3) that includes tags according to the markup language being used to demarcate the tabular structure. The markup file further includes the extracted content embedded within the tags.

In this manner, the input image 112 is analyzed automatically using the ML model 122 to identify the structure of the tabular data from the input image and further to extract the content of the tabular data. Further, the tabular data is represented using a markup format. It should be noted that although a markup format is used throughout the examples described herein, in one or more embodiments of the present invention, the tabular data can be represented using any other electronic formatting or protocols, such as a comma separated volume (CSV), or any other machine readable format.

Figure 6:
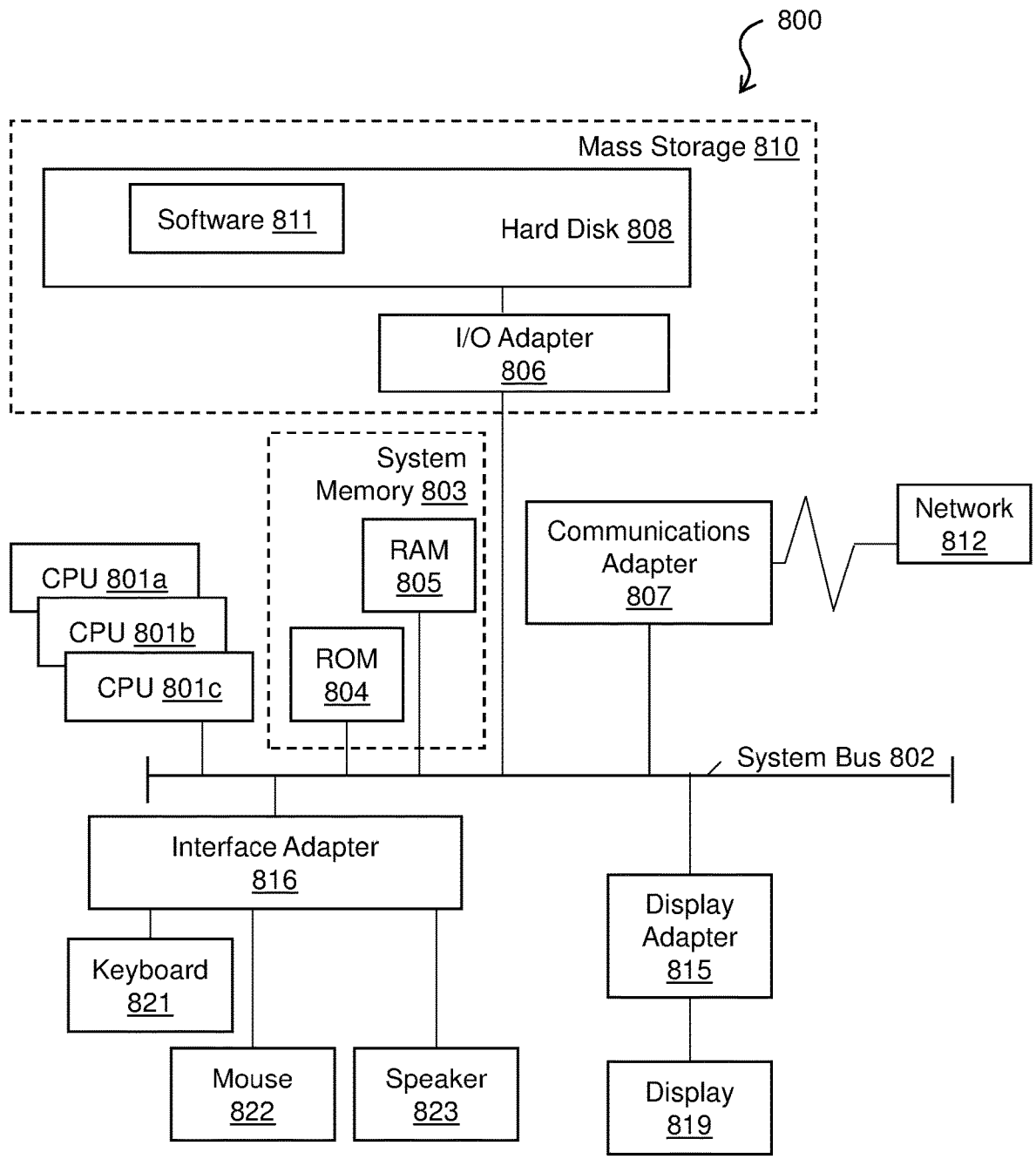
FIG. 6 depicts a computer system according to one or more embodiments of the present invention.

Turning now to FIG. 6, a computer system 800 is generally shown in accordance with an embodiment. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 800 has one or more central processing units (CPU(s)) 801a, 801b, 801c, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein below with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS or AIX operating system from IBM Corporation, to coordinate the functions of the various components shown in FIG. 6.

Additional input/output devices are shown as connected to the system bus 802 via a display adapter 815 and an interface adapter 816 and, in one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 800 includes processing capability in the form of the processors 801, and, storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 6 is not intended to indicate that the computer system 800 is to include all of the components shown in FIG. 6. Rather, the computer system 800 can include any appropriate fewer or additional components not illustrated in FIG. 6 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Embodiments of the present invention can be implemented using cloud computing technology in one or more examples. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
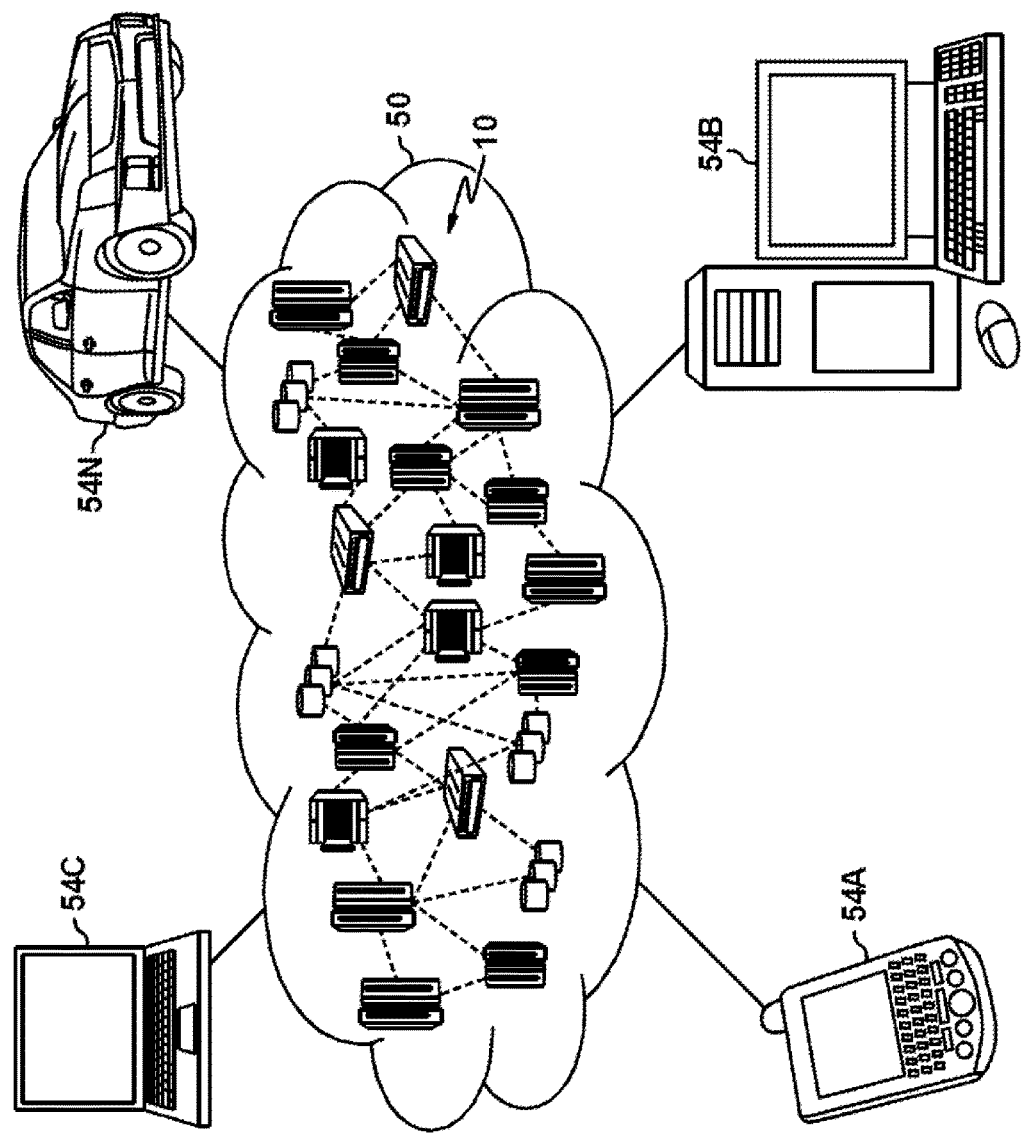
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
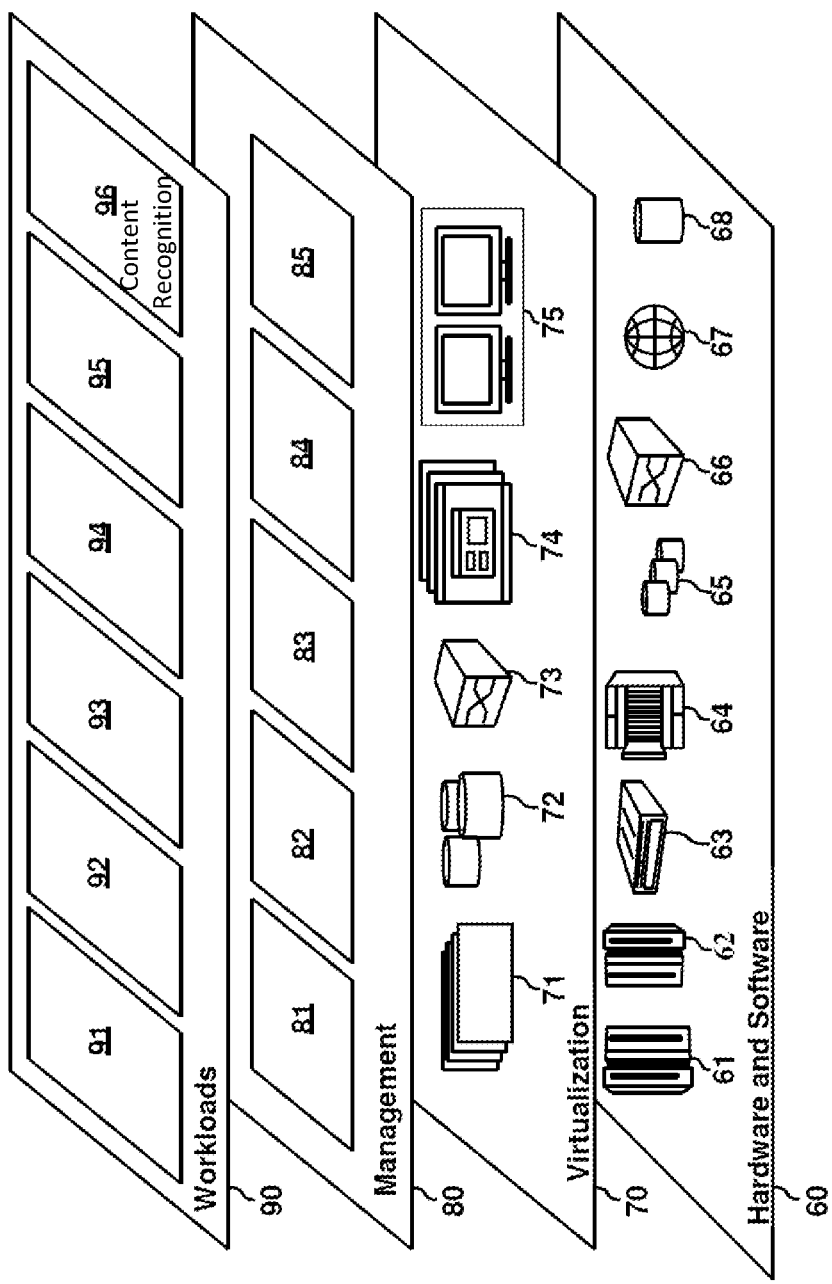
FIG. 8 depicts model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content recognition 96.

Accordingly, one or more embodiments of the present invention facilitate a machine to autonomously understand unstructured tables from various literature that is available in electronic format. Embodiments of the present invention provide a technical solution to a technical challenge in the field of computing technology and improves the computing technology by facilitating the machine to perform such functions autonomously.

Further, embodiments of the present invention provide a practical application by facilitating systems to provide automatic such as corpus conversion and compare and comply. For example, corpus conversion service can be a system supported by machine learning that is trained to parse the tabular data. The system uses optical character recognition (OCR) to locate text in document images and uses handcrafted features to parse tables. To train the system, users need to manually annotate the location of columns, rows, and cells. As described herein, embodiments of the present invention operates without requiring explicit annotations of the elements of tables. Rather, embodiments of the present invention use structured representation as supervision. Accordingly, embodiments of the present invention provide an improved training and an improved system that is suited for end-to-end training and multi-task training. Additionally, existing compare and comply system uses a set of manually defined rules to define the table layout and extract content using OCR technology. Embodiments of the present invention facilitate such extraction by using a processing end-to-end that avoids some of the errors accumulated by the different processing steps in the compare and comply system.

Further, embodiments of the present invention improve the content recognition systems by including tabular data processing and improving performance of tabular data processing in some cases. As noted earlier, a substantial quantity of information is available in unstructured tabular format inside of multiple electronic documents. Such tabular data includes information such as health insurance coverage, information published in the scientific literature, and the like.

Embodiments of the present invention can be fed with an image representation of a table, which is user friendly to obtain. Embodiments of the present invention automatically learn how to recognize the table layout (structure and content) in an end-to-end manner and decide when text is to be extracted. Further, embodiments of the present invention parse and delineate the table structure entirely, rather than just extracting content of each cell from the table as a single unit. Additionally, embodiments of the present invention can parse and delineate multi-column/multi-row tables. Further yet, embodiments of the present invention parse the tabular data without explicit annotations of one or more elements (e.g., locations of columns, rows, and cells) in the structure of the table.

Accordingly, embodiments of the present invention only requires the extracted images of tables to intelligently identify their structures and contents into the reusable markup (HTML/XML) formats. Embodiments of the present invention, thus, provide an advantage over existing OCR based systems, in that embodiments of the present invention facilitates identifying the structure of table images and generates programmatic tables of elements, which is not achieved by the OCR based systems.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A computer-implemented method comprising:
    using a machine learning algorithm of a processor to execute training operations that train a machine learning model, the training operations comprising:
        receiving a set of images of tabular data and a set of markup data corresponding respectively to the images of tabular data;
        training a first neural network to delineate the tabular data from the set of images into cells using the markup data, wherein training the first neural network comprises parsing a first image from the set of images to match a portion of the tabular data from the first image as specified by a corresponding first markup data from the set of markup data, and updating one or more weights from the first neural network based on a structural accuracy computed by comparing the portion with the corresponding first markup data; and
        training a second neural network to determine content of the cells in the tabular data from the set of images using the markup data;
    receiving an input image containing a first tabular data without markup data indicative of a structure of the first tabular data; and
    generating an electronic output corresponding to the first tabular data by determining the structure of the first tabular data using the first neural network and extracting content of the first tabular data using the second neural network.

2. The computer-implemented method of claim 1, wherein training the first neural network further comprises:
    updating the one or more weights from the first neural network based on the structural accuracy being below a predetermined threshold; and
    marking the first neural network as being trained if the structural accuracy exceeds the predetermined threshold.

3. The computer-implemented method of claim 1, wherein training the second neural network comprises extracting content from a second image from the set of images to match content of the tabular data from the second image as specified by a corresponding second markup data from the set of markup data.

4. The computer-implemented method of claim 3, wherein training the second neural network further comprises:
    computing a content accuracy of the second neural network by comparing the content that is extracted from the second image with the content from the corresponding second markup data;
    updating one or more weights from the second neural network based on the content accuracy being below a predetermined threshold; and
    marking the second neural network as being trained if the content accuracy exceeds the predetermined threshold.

5. The computer-implemented method of claim 1, wherein generating the electronic output further comprises merging the structure that is delineated and the extracted content from the input image.

6. The computer-implemented method of claim 5, wherein the electronic output comprises the extracted content from the input image separated according to the structure using a predetermined markup language.

7. A system comprising:
    a memory; and
    a processor coupled with the memory, the processor programmed with machine learning algorithms and configured to perform a method comprising:
        training a machine learning model, the training comprising:
            receiving a set of images of tabular data and a set of markup data corresponding respectively to the images of tabular data;
            training a first neural network to delineate the tabular data from the set of images into cells using the markup data, wherein training the first neural network comprises parsing a first image from the set of images to match a portion of the tabular data from the first image as specified by a corresponding first markup data from the set of markup data, and updating one or more weights from the first neural network based on a structural accuracy computed by comparing the portion with the corresponding first markup data; and
            training a second neural network to determine content of the cells in the tabular data from the set of images using the markup data;
        receiving an input image containing a first tabular data without markup data indicative of a structure of the first tabular data; and
        generating an electronic output corresponding to the first tabular data by determining the structure of the first tabular data using the first neural network and extracting content of the first tabular data using the second neural network.

8. The system of claim 7, wherein training the first neural network further comprises:
    updating the one or more weights from the first neural network based on the structural accuracy being below a predetermined threshold; and
    marking the first neural network as being trained if the structural accuracy exceeds the predetermined threshold.

9. The system of claim 7, wherein training the second neural network comprises extracting content from a second image from the set of images to match content of the tabular data from the second image as specified by a corresponding second markup data from the set of markup data.

10. The system of claim 9, wherein training the second neural network further comprises:

computing a content accuracy of the second neural network by comparing the content that is extracted from the second image with the content from the corresponding second markup data;

updating one or more weights from the second neural network based on the content accuracy being below a predetermined threshold; and marking the second neural network as being trained if the content accuracy exceeds the predetermined threshold.

11. The system of claim 7, wherein generating the electronic output further comprises merging the structure that is delineated and the extracted content from the input image.

12. The system of claim 11, wherein the electronic output comprises the extracted content from the input image separated according to the structure using a predetermined markup language.

13. A computer program product comprising a memory storage device having computer executable instructions stored thereon, the computer executable instructions when executed by a processor cause the processor to perform a method comprising:

training a machine learning model, the training comprising:

receiving a set of images of tabular data and a set of markup data corresponding respectively to the images of tabular data;

training a first neural network to delineate the tabular data from the set of images into cells using the markup data, wherein training the first neural network comprises parsing a first image from the set of images to match a portion of the tabular data from the first image as specified by a corresponding first markup data from the set of markup data, and updating one or more weights from the first neural network based on a structural accuracy computed by comparing the portion with the corresponding first markup data; and training a second neural network to determine content of the cells in the tabular data from the set of images using the markup data;

receiving an input image containing a first tabular data without markup data indicative of a structure of the first tabular data; and generating an electronic output corresponding to the first tabular data by determining the structure of the first tabular data using the first neural network and extracting content of the first tabular data using the second neural network.

14. The computer program product of claim 13, wherein training the first neural network further comprises:

updating the one or more weights from the first neural network based on the structural accuracy being below a predetermined threshold; and marking the first neural network as being trained if the structural accuracy exceeds the predetermined threshold.

15. The computer program product of claim 13, wherein training the second neural network comprises extracting content from a second image from the set of images to match content of the tabular data from the second image as specified by a corresponding second markup data from the set of markup data.

16. The computer program product of claim 15, wherein training the second neural network further comprises:

computing a content accuracy of the second neural network by comparing the content that is extracted from the second image with the content from the corresponding second markup data;

updating one or more weights from the second neural network based on the content accuracy being below a predetermined threshold; and marking the second neural network as being trained if the content accuracy exceeds the predetermined threshold.

17. The computer program product of claim 13, wherein generating the electronic output further comprises merging the structure that is delineated and the extracted content from the input image.

* * * * *